US012564904B2

(12) United States Patent
Kimura et al.

(10) Patent No.: US 12,564,904 B2
(45) Date of Patent: Mar. 3, 2026

(54) LASER PROCESSING DEVICE AND PROCESSED ARTICLE MANUFACTURING METHOD

(71) Applicant: TOWA CORPORATION, Kyoto (JP)

(72) Inventors: Hikaru Kimura, Kyoto (JP); Hideo Ichihashi, Kyoto (JP); Keita Mizuma, Kyoto (JP); Shun Hirano, Kyoto (JP); Takeshi Yachiguchi, Kyoto (JP)

(73) Assignee: TOWA CORPORATION, Kyoto (JP)

( * ) Notice: Subject to any disclaimer, the term of this patent is extended or adjusted under 35 U.S.C. 154(b) by 262 days.

(21) Appl. No.: 18/031,611

(22) PCT Filed: Sep. 30, 2021

(86) PCT No.: PCT/JP2021/036109
§ 371 (c)(1),
(2) Date: Apr. 12, 2023

(87) PCT Pub. No.: WO2022/107459
PCT Pub. Date: May 27, 2022

(65) Prior Publication Data
US 2023/0398638 A1 Dec. 14, 2023

(30) Foreign Application Priority Data
Nov. 17, 2020 (JP) ................................. 2020-190653

(51) Int. Cl.
*B23K 26/382* (2014.01)
*B23K 26/035* (2014.01)
(Continued)

(52) U.S. Cl.
CPC ........... *B23K 26/382* (2015.10); *B65H 20/00* (2013.01); *B23K 26/037* (2015.10); *B23K 26/083* (2013.01);
(Continued)

(58) Field of Classification Search
CPC .................... B65H 20/00; B65H 20/18; B65H 2301/51536; B23K 26/0846; B23K 26/083; B23K 26/10; B23K 26/382
See application file for complete search history.

(56) References Cited

U.S. PATENT DOCUMENTS 10,254,499 B1 4/2019 Cohen et al.
2005/0263506 A1* 12/2005 Masuda ............. B23K 26/0853
219/121.7
2011/0203430 A1 8/2011 Nakai et al.

FOREIGN PATENT DOCUMENTS

CN 103817444 5/2014
CN 105234562 1/2016
(Continued)

OTHER PUBLICATIONS

English Translation for Naoyuki JP 2019098355 (Year: 2019).*
(Continued)

*Primary Examiner* — Seyed Masoud Malekzadeh
(74) *Attorney, Agent, or Firm* — JCIPRNET

(57) ABSTRACT
Provided is a laser processing device that enables a film to be stabilized and processed. The present invention comprises: a conveyance mechanism that conveys a film; a holding mechanism that has a pair of holding parts which can at least sandwich and hold lateral portions of the processing range of the film; and a laser mechanism for processing the processing range of the film held by the holding mechanism.

10 Claims, 9 Drawing Sheets

(51) Int. Cl.
*B23K 26/08* (2014.01)
*B23K 26/10* (2006.01)
*B65H 20/00* (2006.01)

(52) U.S. Cl.
CPC .... *B23K 26/10* (2013.01); *B65H 2301/51536* (2013.01); *B65H 2405/52* (2013.01)

(56) References Cited

FOREIGN PATENT DOCUMENTS

| | | | | |
|---|---|---|---|---|
| CN | 110640384 | 1/2020 | | |
| CN | 210878143 | 6/2020 | | |
| CN | 111531760 | 8/2020 | | |
| CN | 211615631 | 10/2020 | | |
| JP | H0890271 | 4/1996 | | |
| JP | H1158061 | 3/1999 | | |
| JP | 2016000426 | 1/2016 | | |
| JP | 6277876 | 2/2018 | | |
| JP | 2019098355 A * | 6/2019 | ............ | G02B 26/10 |
| KR | 20140040789 | 4/2014 | | |
| TW | 200936303 | 9/2009 | | |
| TW | 201123471 | 7/2011 | | |
| TW | 201808510 | 3/2018 | | |
| TW | 201927450 | 7/2019 | | |
| WO | 2010021025 | 2/2010 | | |
| WO | 2017011296 | 1/2017 | | |

OTHER PUBLICATIONS

"International Preliminary report on patentability (Form PCT/IB/326) mailed on Jun. 1, 2023, International Preliminary report on patentability (Form PCT/IB/373) issued May 16, 2023, International Preliminary report on patentability (Form PCT/IB/338) mailed on Jun. 1, 2023 and Written Opinion (Form PCT/ISA/237) with English translation thereof mailed on Nov. 22, 2021, of PCT/JP2021/036109", pp. 1-11.

"Office Action of Korea Counterpart Application", issued on Aug. 12, 2024, with English translation thereof, p. 1-p. 10.

"International Search Report (Form PCT/ISA/210) of PCT/JP2021/036109", mailed on Nov. 22, 2021, with English translation thereof, pp. 1-4.

"Office Action of Taiwan Counterpart Application", issued on Apr. 13, 2022, with English translation thereof, p. 1-p. 12.

"Office Action of Taiwan Counterpart Application", issued on Sep. 7, 2022, with English translation thereof, p. 1-p. 15.

"Office Action of Taiwan Counterpart Application", issued on Feb. 10, 2023, with English translation thereof, p. 1-p. 15.

"Office Action of Taiwan Counterpart Application", issued on Aug. 11, 2023, with English translation thereof, p. 1-p. 6.

* cited by examiner

LASER PROCESSING DEVICE AND PROCESSED ARTICLE MANUFACTURING METHOD

CROSS-REFERENCE TO RELATED APPLICATION

This application is a 371 application of the International PCT application serial no. PCT/JP2021/036109, filed on Sep. 30, 2021, which claims the priority benefits of Japan Patent Application No. 2020-190653, filed on Nov. 17, 2020. The entirety of each of the above-mentioned patent applications is hereby incorporated by reference herein and made a part of this specification.

TECHNICAL FIELD

The present invention relates to technologies of a laser processing device and a processed article manufacturing method.

RELATED ART

Patent Literature 1 discloses a resin film processing device that includes a conveyance means for conveying a resin film, a hole forming means for forming holes in the resin film, and a control means for controlling these operations. In this resin film processing device, holes can be formed in the resin film by irradiating the resin film conveyed by rollers of the conveyance means with a laser light from the hole forming means.

CITATION LIST

Patent Literature

[Patent Literature 1] Japanese Patent Laid-Open No. 2016-426

SUMMARY OF INVENTION

Technical Problem

However, in the technology as described in Patent Literature 1, there is room for improvement in that the resin film cannot be stably processed because the resin film may shake due to influence of the vibration caused during irradiation of the laser light and the exhaust caused by dust collection.

The present invention has been made in view of the above circumstances, and the problem to be solved is to provide a laser processing device and a processed article manufacturing method that are capable of stably processing a film.

Solution to Problem

The problem to be solved by the present invention is as described above, and in order to solve the problem, a laser processing device according to the present invention includes a conveyance mechanism conveying a film, a holding mechanism having a pair of holding parts capable of sandwiching and holding at least lateral sides of a processing target range of the film, and a laser mechanism processing the processing target range of the film held by the holding mechanism.

Further, a processed article manufacturing method according to the present invention processes the film using the laser processing device.

Effects of Invention

According to the present invention, a film can be stably processed.

Figure 6:
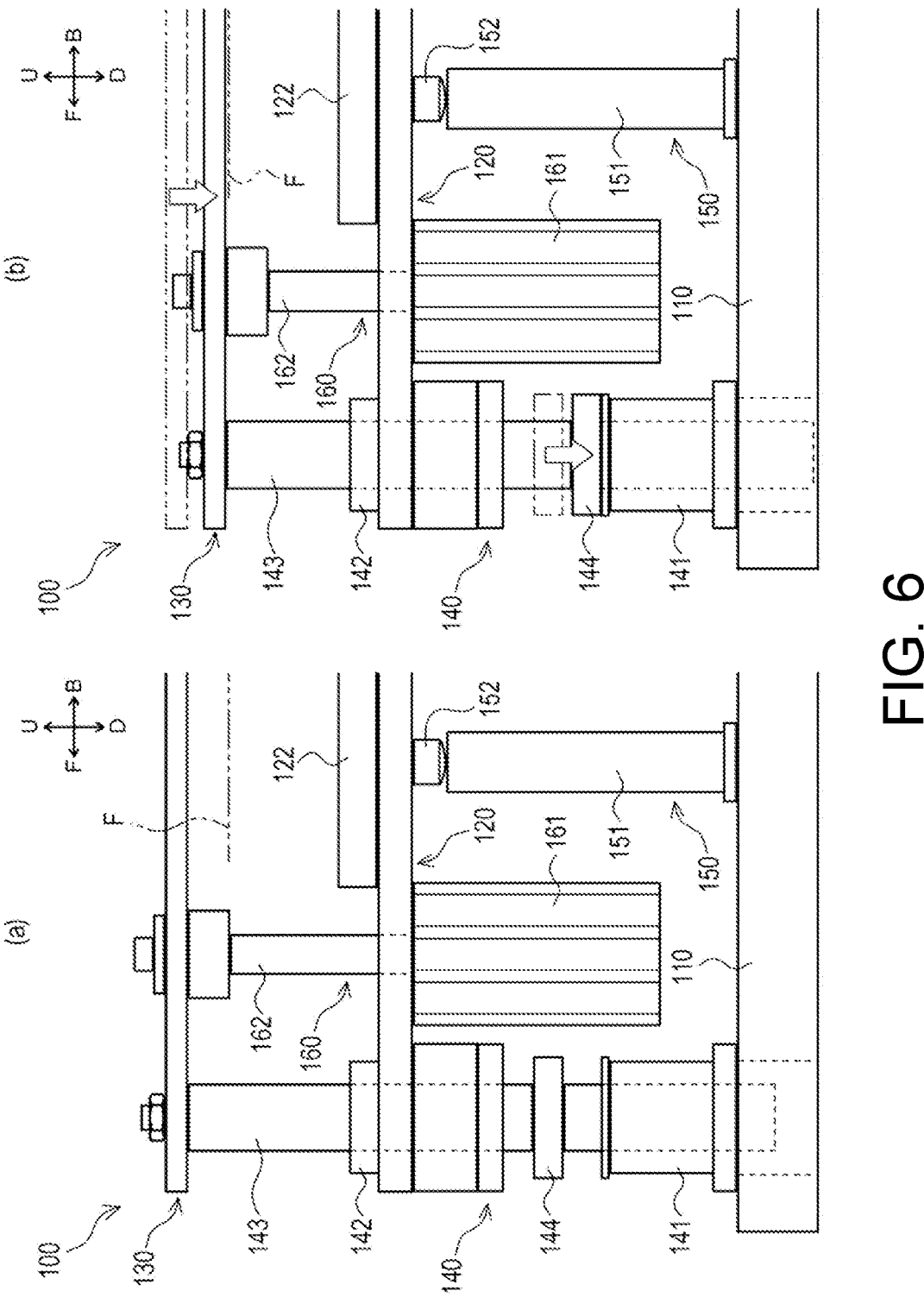

(a) of FIG. 6 is a side view showing the holding mechanism in a state where the film is not held. (b) of FIG. 6 is a side view showing the holding mechanism in a state where the upper holding part is lowered.

Figure 7:
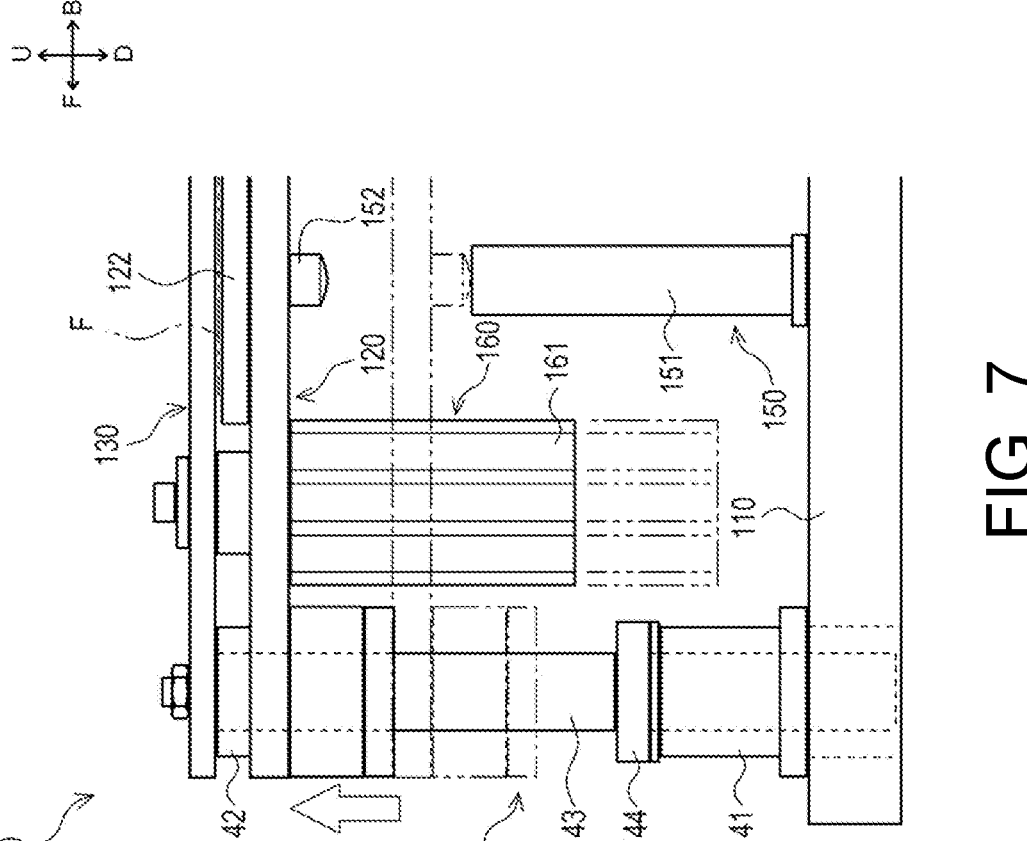

FIG. 7 is a side view showing the holding mechanism in a state where the film is being held.

Figure 8:
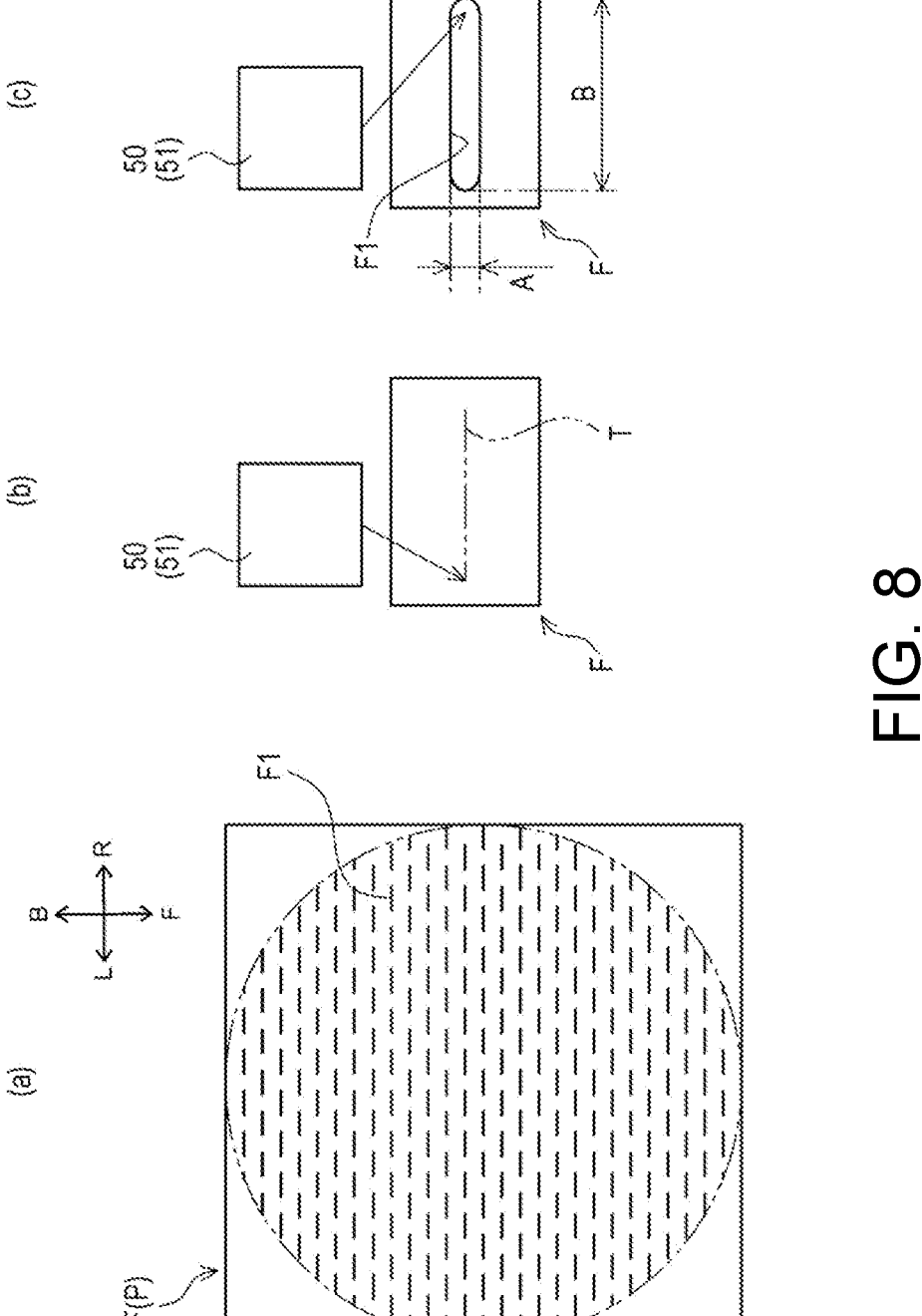

(a) of FIG. 8 is a schematic plan view showing the film formed with a plurality of holes. (b) of FIG. 8 is a schematic view showing the trajectory of the laser light. (c) of FIG. 8 is a schematic view showing the shape of the hole formed in the film.

Figure 9:
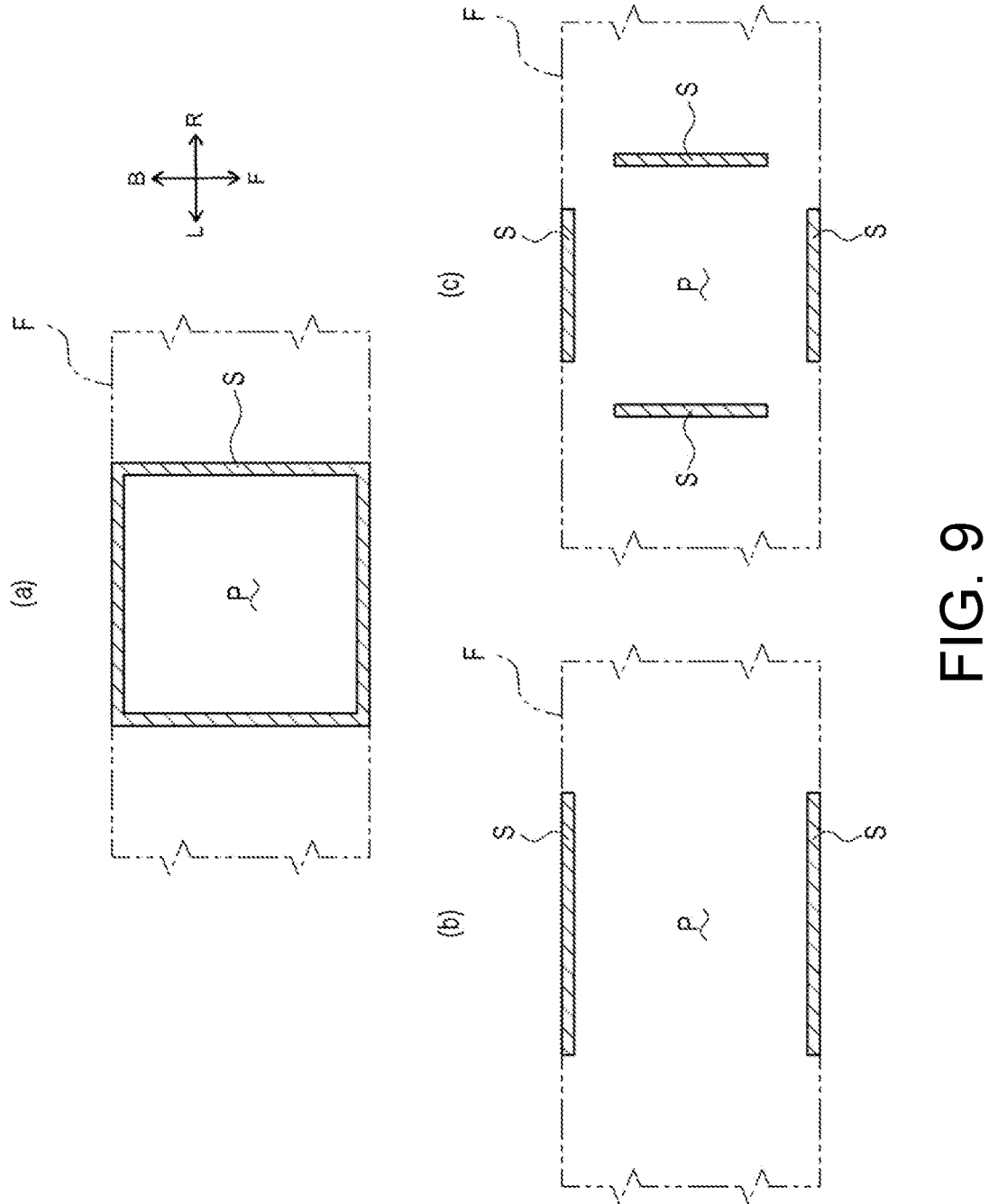

(a) of FIG. 9 is a schematic plan view showing the portion sandwiching the film. (b) of FIG. 9 is a schematic plan view showing a modified example of the portion sandwiching the film. (c) of FIG. 9 is a schematic plan view showing a modified example of the portion sandwiching the film.

DESCRIPTION OF EMBODIMENTS

A laser processing device 1 according to this embodiment, which will be described below, is a device for processing a film F that is a workpiece (object to be processed). First, the film F to be processed will be described.

In this embodiment, the film F to be processed by the laser processing device 1 is assumed to be a release film used in a resin molding device. As the release film, for example, a polystyrene film, a PET film, a polymethylpentene film or the like can be used. The release film is sucked and held on the surface of a mold so that the resin does not adhere to the mold in the resin molding device.

Here, in order to further suck and hold a wafer or the like to be resin-molded to the mold sucking and holding the release film, it is necessary to form holes in the release film to the extent that air can pass through. In order to obtain such a release film, the laser processing device 1 according to this embodiment forms (perforates) a plurality of holes F1 (see FIG. 8) in the film F.

<Overall Configuration of the Laser Processing Device 1>

Figure 1:
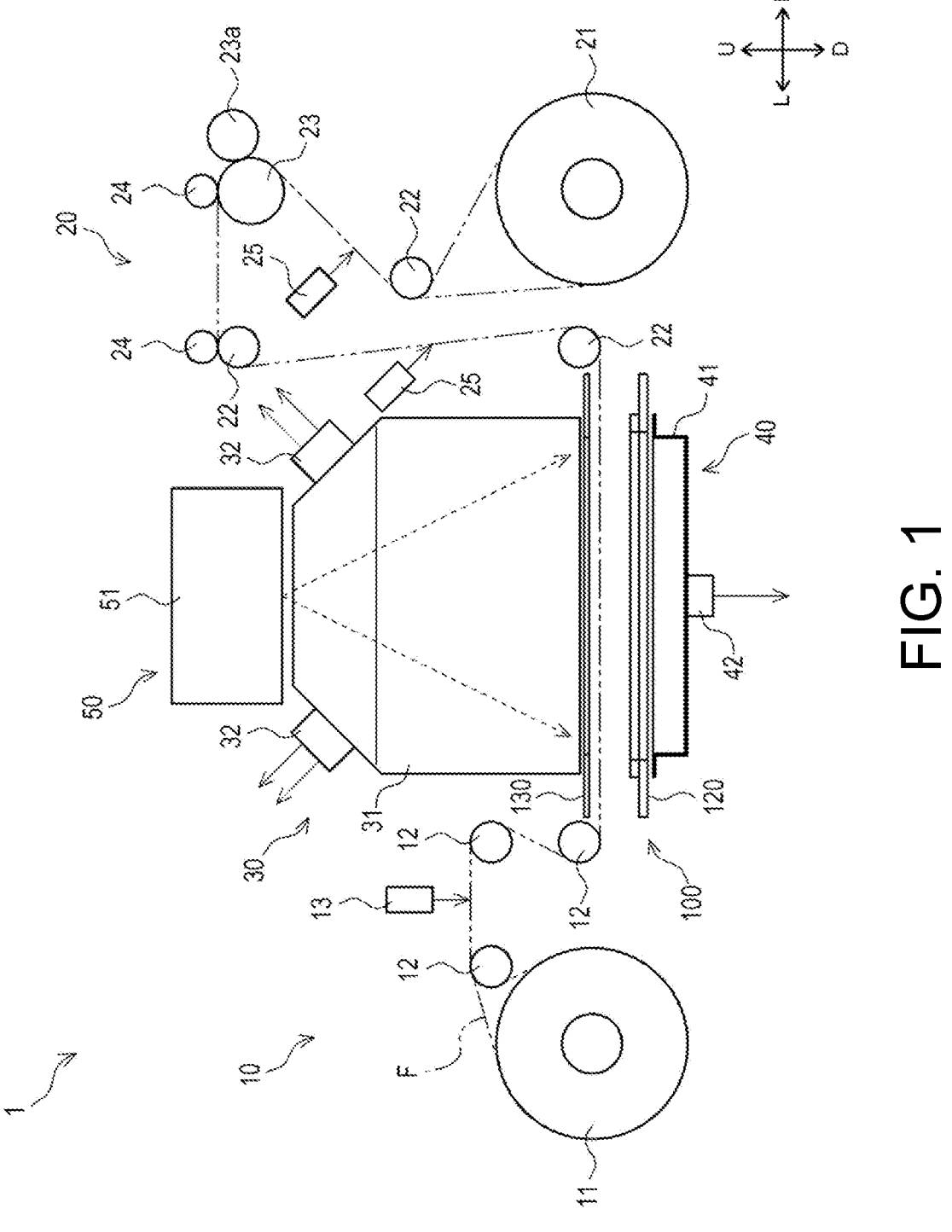
FIG. 1 is a schematic side view showing the overall configuration of the laser processing device.

Next, the configuration of the laser processing device 1 according to this embodiment will be described with reference to FIG. 1. In the following description, the directions indicated by the arrow U, arrow D, arrow L, arrow R, arrow F, and arrow B shown in the drawings are defined as upward, downward, leftward, rightward, forward, and backward directions, respectively.

The laser processing device 1 mainly includes an unwinding mechanism 10, a winding mechanism 20, a holding mechanism 100, an upper dust collecting mechanism 30, a lower dust collecting mechanism 40, and a laser mechanism 50.

<Unwinding Mechanism 10>

The unwinding mechanism 10 supplies the film F wound in a roll shape to the holding mechanism 100 which will be described later. The unwinding mechanism 10 mainly includes an unwinding roller 11, a guide roller 12, and an ionizer 13.

The unwinding roller 11 supports the film F wound in a roll shape. The unwinding roller 11 is formed in a columnar shape and arranged with the axis directed horizontally (in the depth direction of the paper surface of FIG. 1). The film F before being processed is wound around the unwinding roller 11. The unwinding roller 11 is provided with a drive source (such as a motor) not shown. Appropriate tension can be applied to the film F pulled out from the unwinding roller 11 by applying an appropriate rotational force to the unwinding roller 11 with the drive source.

The guide roller 12 guides the film F pulled out from the unwinding roller 11 to the holding mechanism 100. The guide roller 12 is formed in a columnar shape and arranged with the axis directed horizontally (in the depth direction of the paper surface of FIG. 1). Three guide rollers 12 are provided. The film F pulled out from the unwinding roller 11 is sequentially wound around the three guide rollers 12. The film F is given appropriate tension by the three guide rollers 12 and is guided while changing the direction to an appropriate direction.

The ionizer 13 removes static electricity from the film F. The ionizer 13 can neutralize the static electricity of the film F with ions. The ionizer 13 is arranged in the middle of the passage of the film F guided by the guide rollers 12.

<Winding Mechanism 20>

The winding mechanism 20 winds up the film F that has been processed by the laser mechanism 50. The winding mechanism 20 mainly includes a winding roller 21, a guide roller 22, a feeding roller 23, an adhesive roller 24, and an ionizer 25.

The winding roller 21 winds the film F into a roll shape. The winding roller 21 is formed in a columnar shape and arranged with the axis directed horizontally (in the depth direction of the paper surface of FIG. 1). The film F that has been processed is wound around the winding roller 21. The winding roller 21 is provided with a drive source (such as a motor) not shown. Appropriate tension can be applied to the film F wound around the winding roller 21 by applying an appropriate rotational force to the winding roller 21 with the drive source.

The guide roller 22 guides the film F that has been processed by the laser mechanism 50 (passed through the holding mechanism 100) to the winding roller 21. The guide roller 22 is formed in a columnar shape and arranged with the axis directed horizontally (in the depth direction of the paper surface of FIG. 1). Three guide rollers 22 are provided. The film F that has been processed by the laser mechanism 50 is sequentially wound around the three guide rollers 22 and the feeding roller 23 which will be described later. The film F is given appropriate tension by the three guide rollers 22 and the feeding roller 23, which will be described later, and is guided to the winding roller 21 while changing the direction to an appropriate direction.

The feeding roller 23 feeds the film F from the unwinding roller 11 toward the winding roller 21. The feeding roller 23 is formed in a columnar shape and arranged with the axis directed horizontally (in the depth direction of the paper surface of FIG. 1). The feeding roller 23 is provided with an anti-slip roller 23a that sandwiches the film F with the feeding roller 23 so that the wound film F does not slip on the feeding roller 23. The anti-slip roller 23a is, for example, made of an elastic material such as rubber. The feeding roller 23 is provided with a drive source (such as a motor) not shown. By rotating the feeding roller 23 with the drive source, the film F can be fed from the unwinding roller 11 toward the winding roller 21.

The adhesive roller 24 removes dust and processing waste (contaminants) adhering to the film F that has been processed. The adhesive roller 24 is formed in a columnar shape and arranged with the axis directed horizontally (in the depth direction of the paper surface of FIG. 1). Two adhesive rollers 24 are provided. The adhesive rollers 24 are arranged so as to respectively sandwich the film F with the guide roller 22 and the feeding roller 23.

The ionizer 25 removes static electricity from the film F. The ionizer 25 can neutralize the static electricity of the film F with ions. The ionizer 25 is arranged in the middle of the passage of the film F guided by the guide rollers 22 and the feeding roller 23.

Devices for removing static electricity from the film F are not limited to the ionizer 13 and the ionizer 25 described above. For example, it is also possible to use a static elimination brush or the like that can remove static electricity by contacting the surface of the film F.

<Holding Mechanism 100>

The holding mechanism 100 sandwiches and holds the film F when the film F is processed. The holding mechanism 100 can hold the film F by sandwiching the film F from above and below with a lower holding part 120 and an upper holding part 130. The specific configuration of the holding mechanism 100 will be described later.

<Upper Dust Collecting Mechanism 30>

The upper dust collecting mechanism 30 collects fumes, particulate matter or the like generated when the film F is processed. The upper dust collecting mechanism 30 mainly includes an upper housing 31 and an upper duct 32.

The upper housing 31 covers the holding mechanism 100 (more specifically, the upper surface of the upper holding part 130 which will be described later) from above. The upper housing 31 is formed in a hollow box shape. The upper housing 31 is arranged right above the holding mechanism 100. The lower surface of the upper housing 31 (the portion facing the upper holding part 130) is open.

The upper duct 32 communicates the inside and the outside of the upper housing 31. The upper duct 32 is formed in a tubular shape. The upper duct 32 is provided in the upper portion of the upper housing 31. The upper duct 32 is connected to a fan (not shown). By driving the fan, the air in the upper housing 31 can be discharged via the upper duct 32.

<Lower Dust Collecting Mechanism 40>

The lower dust collecting mechanism 40 collects fumes, particulate matter or the like generated when the film F is processed. The lower dust collecting mechanism 40 mainly includes a lower housing 41 and a lower duct 42.

The lower housing 41 covers the holding mechanism 100 (more specifically, the lower surface of the lower holding part 120 which will be described later) from below. The lower housing 41 is formed in a hollow box shape. The lower housing 41 is arranged right below the holding mechanism 100. The upper surface of the lower housing 41 (the portion facing the lower holding part 120) is open. The lower housing 41 is fixed to the lower holding part 120.

The lower duct 42 communicates the inside and the outside of the lower housing 41. The lower duct 42 is formed in a tubular shape. The lower duct 42 is provided at the bottom of the lower housing 41. The lower duct 42 is connected to a fan (not shown). By driving the fan, the air in the lower housing 41 can be discharged via the lower duct 42.

<Laser Mechanism 50>

The laser mechanism 50 processes the film F using a laser light. The laser mechanism mainly includes a processing head 51.

The processing head 51 irradiates a laser light. The processing head 51 is provided on the top of the upper housing 31. The processing head 51 can irradiate a laser light oscillated by an oscillation device (not shown) downward. The processing head 51 can arbitrarily change the irradiation direction of the laser light. The laser light emitted from the processing head 51 is irradiated to the film F held by the holding mechanism 100 through the inside of the upper housing 31. By irradiating the film F with the laser light in this way, the film F can be processed.

Various lasers such as UV laser and $CO_2$ laser can be used as the laser used in the laser mechanism 50.

The operation of each part of the laser processing device 1 described above is controlled by a controller (not shown) including an arithmetic processor such as CPU, a storage part such as RAM and ROM, etc.

<Processing Method Performed by the Laser Processing Device 1>

Next, a method of processing the film F using the laser processing device 1 configured as described above (a method of manufacturing the film F formed with the holes F1) will be described.

When the feeding roller 23 rotates clockwise in the side view (see FIG. 1), the film F moves from the unwinding roller 11 toward the winding roller 21 while being guided by the guide rollers 12, etc. Specifically, the film F pulled out from the unwinding roller 11 passes rightward between the lower holding part 120 and the upper holding part 130 of the holding mechanism 100 and is wound around the winding roller 21.

At this time, static electricity is removed by the ionizer 13 before the film F pulled out from the unwinding roller 11 reaches the holding mechanism 100. When the portion of the film F to be processed (processing target range P (see FIG. 3) which will be described later) reaches the holding mechanism 100, the feeding roller 23 is stopped, and the movement of the film F is stopped. Then, the film F is sandwiched and held from above and below by the holding mechanism 100 (the lower holding part 120 and the upper holding part 130). By holding the film F in this way, it is possible to prevent the film F from shaking or wrinkling due to the influence of vibration or air.

While the film F is held by the holding mechanism 100, the upper dust collecting mechanism 30 and the lower dust collecting mechanism 40 are operated, and the film F is perforated by the laser mechanism 50. Thus, a plurality of holes F1 can be formed in the film F while fumes or the like are collected.

When the processing of the portion held by the holding mechanism 100 is completed, the lower holding part 120 and the upper holding part 130 move upward and downward so as to separate from the film F, and the film F is released. In this state, the feeding roller 23 rotates again and the film F moves toward the winding roller 21.

Before the film F processed by the laser mechanism 50 reaches the winding roller 21, static electricity is removed by the ionizer 25, and contaminants are removed by the adhesive roller 24. Then, the film F is wound around the winding roller 21.

By repeating such movement of the film F by a certain distance and processing by the laser mechanism 50, a roll-shaped film F formed with a plurality of holes F1 can be manufactured.

<Specific Configuration of the Holding Mechanism 100>

Next, the configuration of the holding mechanism 100 will be described with reference to FIG. 2 to FIG. 5.

As described above, the holding mechanism 100 sandwiches and holds the film F when the film F is processed. The holding mechanism 100 mainly includes a base part 110, the lower holding part 120, the upper holding part 130, an upper stopper mechanism 140, a lower stopper mechanism 150, and an actuator 160.

The base part 110 shown in FIG. 2 supports each member (the upper holding part 130, etc. which will be described later) that constitutes the holding mechanism 100. The base part 110 is formed in a rectangular parallelepiped shape and placed on the floor.

Figure 2:
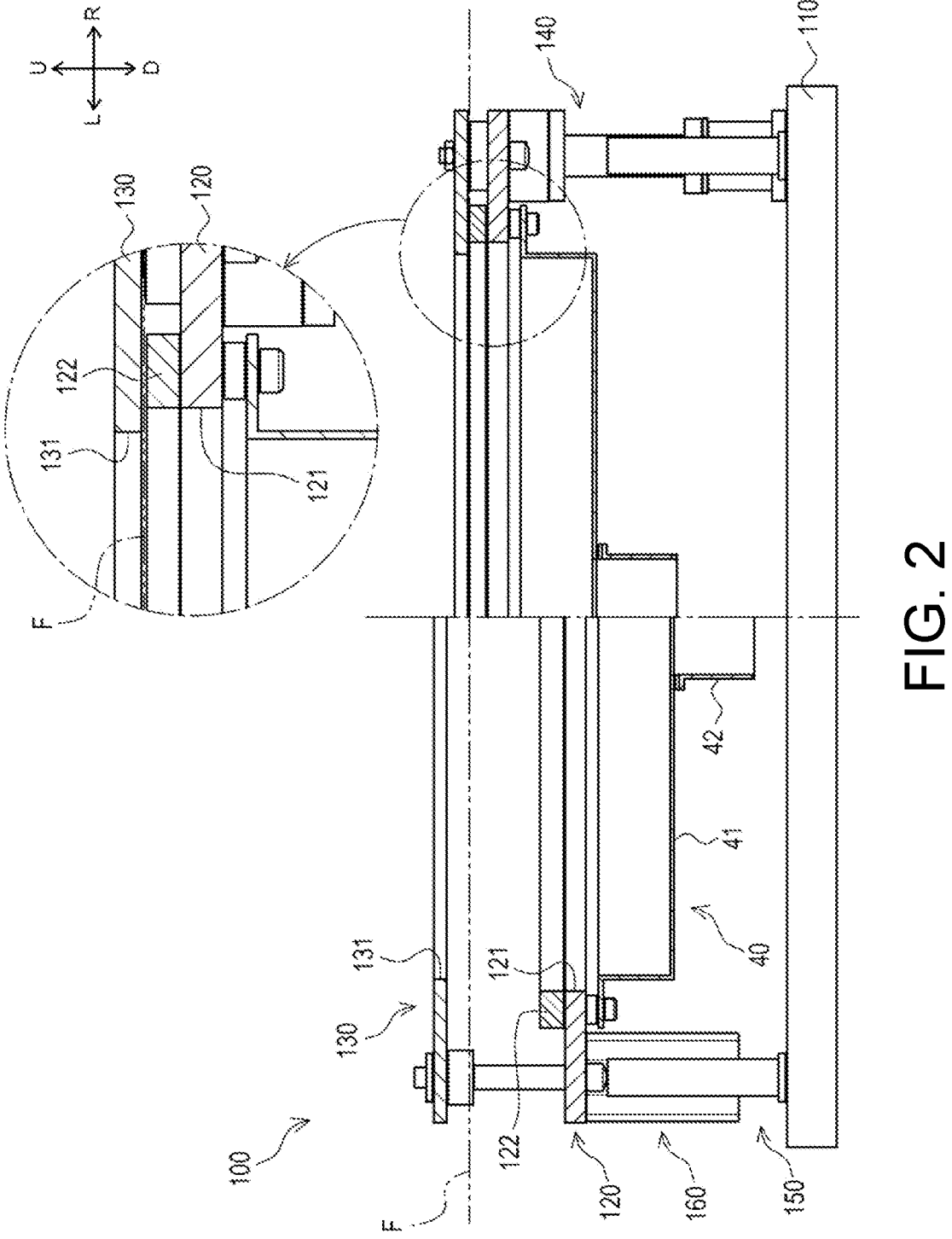
FIG. 2 is a front cross-sectional view showing the holding mechanism (the left side shows a state where the film is not held, and the right side shows a state where the film is being held).
Figure 3:
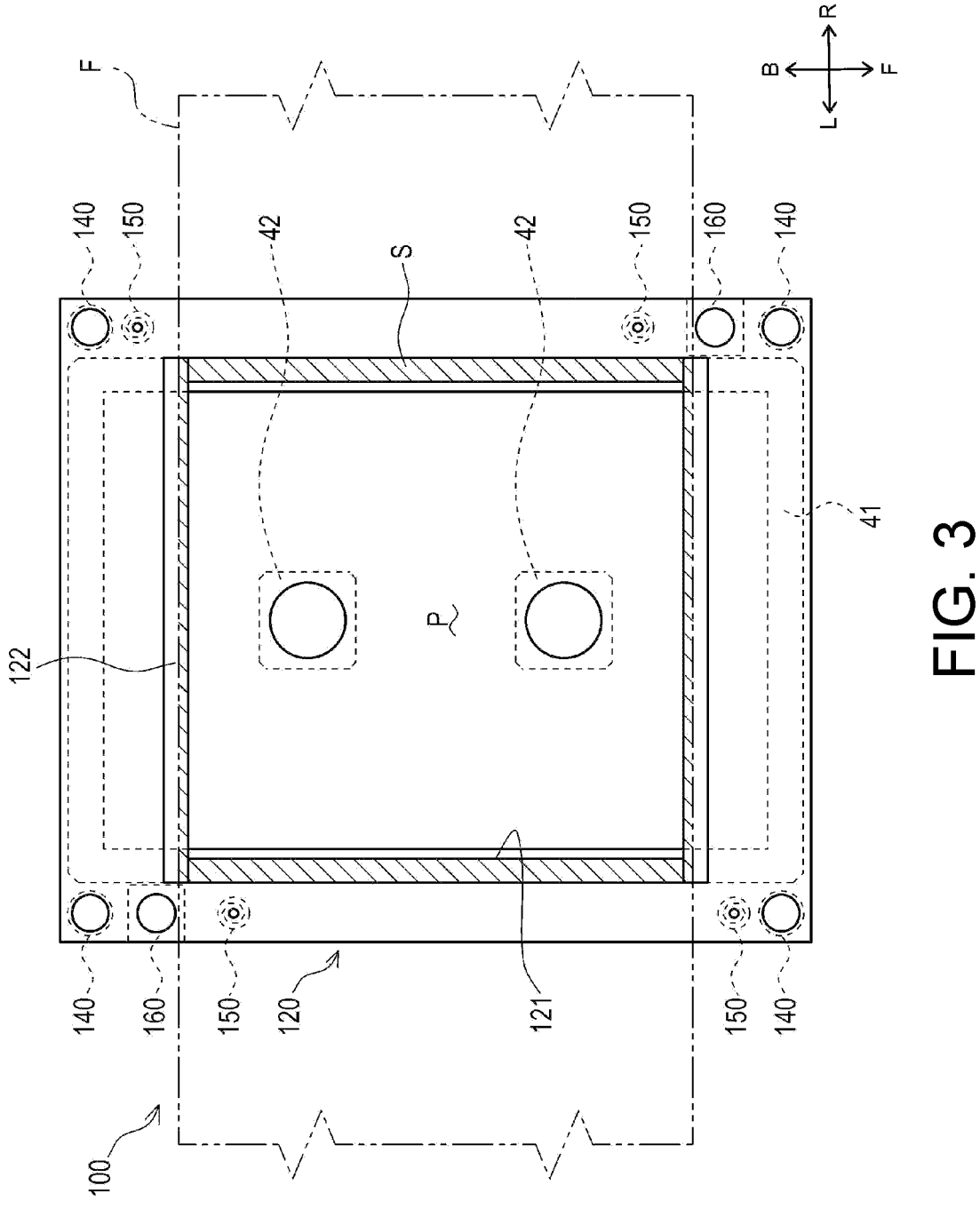
FIG. 3 is a plan view showing the holding mechanism (particularly, the lower holding part).
Figure 4:
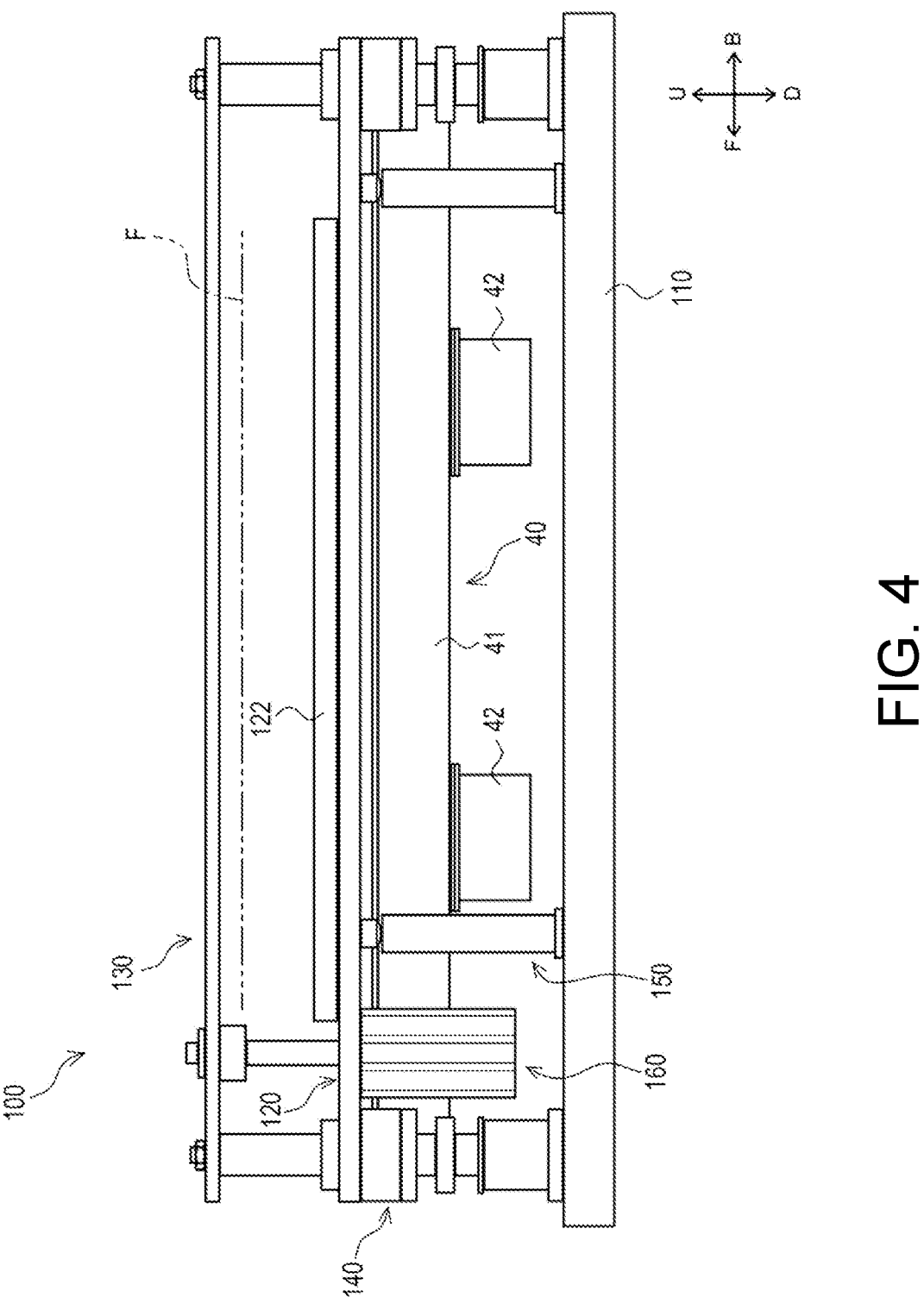
FIG. 4 is a side view showing the holding mechanism.

The lower holding part 120 shown in FIG. 2 to FIG. 4 is a member capable of contacting the lower surface of the film F. The lower holding part 120 is formed in a rectangular frame shape in plan view. Specifically, the lower holding part 120 is formed by providing a rectangular opening 121 in the central portion of a rectangular plate-shaped member in plan view. The front-rear width of the opening 121 is formed slightly smaller than the front-rear width of the film F. A sponge 122 is provided on the upper surface of the lower holding part 120. The sponge 122 is an elastic member. The sponge 122 is arranged to surround the opening 121 over the entire circumference. Thus, the sponge 122 is arranged in a rectangular frame shape in plan view.

The upper holding part 130 shown in FIG. 2 and FIG. 4 is a member capable of contacting the upper surface of the film F. The upper holding part 130 is formed in substantially the same shape (a rectangular frame shape in plan view) as the lower holding part 120. That is, the upper holding part 130 is formed by providing a rectangular opening 131 in the central portion of a rectangular plate-shaped member in plan view. The opening 131 is formed one size smaller than the opening 121 of the lower holding part 120. Specifically, the front-rear width and left-right width of the opening 131 are formed slightly smaller than the front-rear width and left-right width of the opening 121 (see the enlarged portion in FIG. 2).

The upper holding part 130 is arranged above the lower holding part 120. The upper holding part 130 is arranged with an outer shape matching the outer shape of the lower holding part 120 in plan view. Thus, the upper holding part 130 is arranged to vertically face the lower holding part 120.

Figure 5:
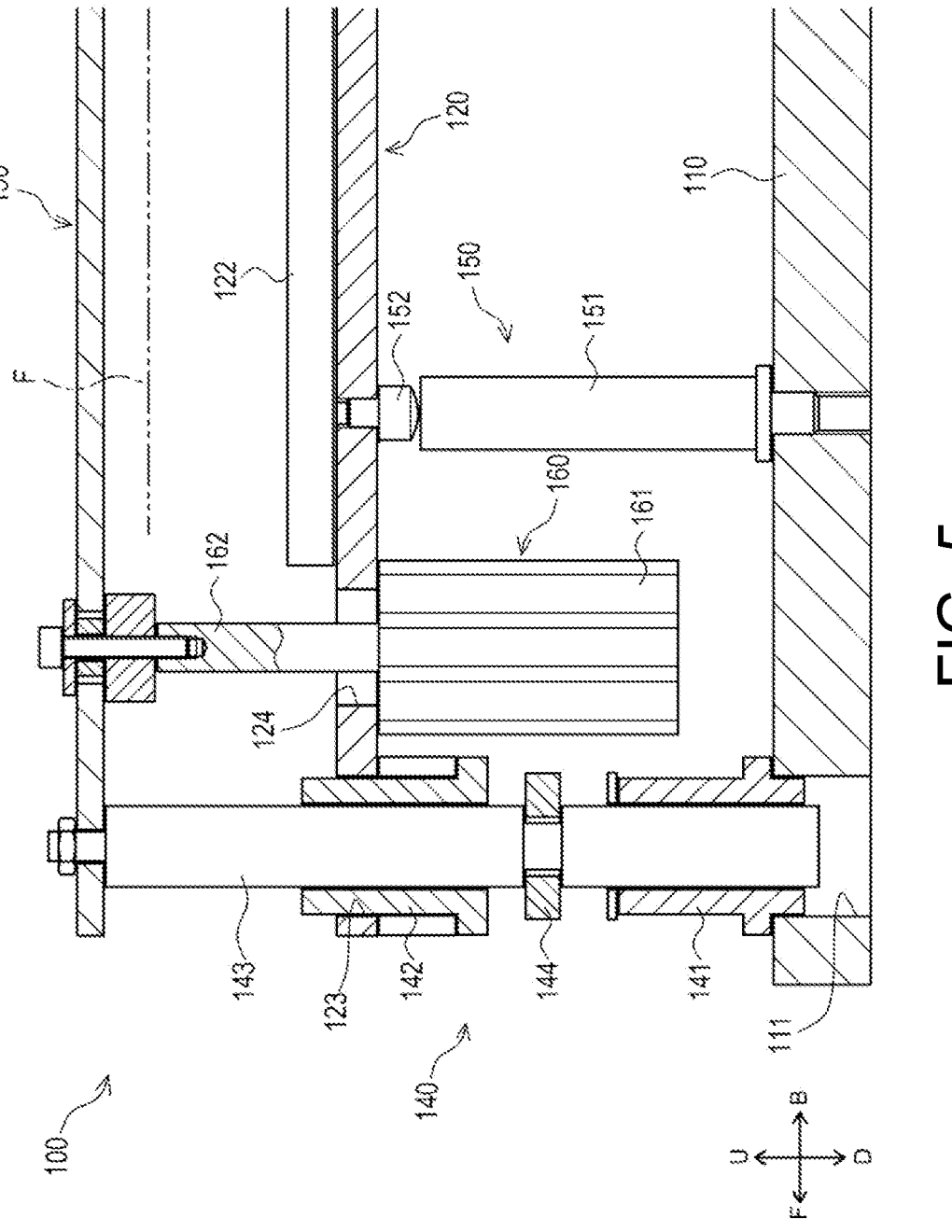
FIG. 5 is a side cross-sectional view showing the configuration of the stopper mechanism and the actuator.

The upper stopper mechanism 140 shown in FIG. 2 to FIG. 5 guides the lower holding part 120 and the upper holding part 130 upward and downward, and restricts the downward movement of the upper holding part 130 at a predetermined position. As shown in FIG. 5, the upper stopper mechanism 140 mainly includes a lower bushing 141, an upper bushing 142, a movable shaft 143, and a stopper 144.

The lower bushing 141 is fixed to the base part 110 and guides the movable shaft 143 which will be described later. The lower bushing 141 is formed in a cylindrical shape and arranged with the axis directed in the vertical direction. The lower portion of the lower bushing 141 is fixed while being inserted into a hole 111 formed to vertically penetrate the base part 110.

The upper bushing 142 is fixed to the lower holding part 120 and guides the movable shaft 143 which will be described later. The upper bushing 142 is formed in a cylindrical shape and arranged with the axis directed in the vertical direction. The upper bushing 142 is arranged coaxially with the lower bushing 141. The upper bushing 142 is fixed while being inserted into a hole 123 formed to vertically penetrate the lower holding part 120.

The movable shaft 143 guides the lower holding part 120 and the upper holding part 130 upward and downward. The movable shaft 143 is formed in a columnar shape and arranged with the axis directed in the vertical direction. The movable shaft 143 is inserted into the lower bushing 141 and the upper bushing 142. The movable shaft 143 can move along the axial direction of the lower bushing 141 and the upper bushing 142. The upper end portion of the movable shaft 143 is fixed to the upper holding part 130.

The stopper 144 restricts downward movement of the movable shaft 143 at a predetermined position. The stopper 144 is arranged between the lower bushing 141 and the upper bushing 142 in the up-down direction. The stopper 144 is fitted onto the movable shaft 143 from the outside to be fixed to the movable shaft 143. Thus, the stopper 144 is arranged so as to protrude radially outward of the movable shaft 143 from the outer peripheral surface of the movable shaft 143.

As shown in FIG. 3, the upper stopper mechanism 140 configured in this way is provided respectively at four corner sections (four corners) of the lower holding part 120 which is formed in a rectangular shape in plan view.

The lower stopper mechanism 150 shown in FIG. 2 to FIG. 5 restricts downward movement of the lower holding part 120 at a predetermined position. As shown in FIG. 5, the lower stopper mechanism 150 mainly includes a fixed shaft 151 and a stopper 152.

The fixed shaft 151 is in contact with the stopper 152 which will be described later. The fixed shaft 151 is formed in a columnar shape and arranged with the axis directed in the vertical direction. The lower end portion of the fixed shaft 151 is fixed to the upper surface of the base part 110. The fixed shaft 151 is arranged to protrude upward from the base part 110.

The stopper 152 restricts downward movement of the lower holding part 120 at a predetermined position. The stopper 152 is formed in a columnar shape and arranged with the axis directed in the vertical direction. The stopper 152 is arranged coaxially with the fixed shaft 151. The stopper 152 is fixed to the lower surface of the lower holding part 120. The stopper 152 is arranged to protrude downward from the lower holding part 120.

As shown in FIG. 3, the lower stopper mechanism 150 configured in this way is provided respectively at four corner sections (four corners) of the lower holding part 120 which is formed in a rectangular shape in plan view.

The actuator 160 shown in FIG. 2 to FIG. 5 moves the lower holding part 120 and the upper holding part 130 upward and downward. The actuator 160 is configured by an air cylinder. As shown in FIG. 5, the actuator 160 mainly includes a cylinder body 161 and a rod 162.

The cylinder body 161 supports the rod 162, which will be described later, so as to expand and contract. The cylinder body 161 is fixed to the lower surface of the lower holding part 120.

The rod 162 can slide (expand and contract) with respect to the cylinder body 161. The rod 162 is formed in a columnar shape and arranged with the axis directed in the vertical direction. The rod 162 is arranged to protrude upward from the cylinder body 161. The rod 162 is inserted into a hole 124 formed to vertically penetrate the lower holding part 120 and is arranged to protrude above the lower holding part 120. The upper end portion of the rod 162 is fixed to the upper holding part 130. By appropriately supplying air to the cylinder body 161, the rod 162 can be vertically slid with respect to the cylinder body 161. Nevertheless, the rod 162 is not necessarily fixed to the upper holding part 130, and for example, the upper end of the rod 162 may be brought into contact with the upper holding part 130 from below without being fixed to the upper holding part 130.

By using the actuator 160 having the rod 162 which is fixed to the lower holding part 120 and expands and contracts in one direction in this way, the upper holding part 130 can be relatively moved in the direction approaching or in the direction separating from the lower holding part 120. Further, with the operation of the actuator 160, the lower holding part 120 and the upper holding part 130 can be moved upward and downward, respectively. Details of the operation using the actuator 160 will be described later.

As shown in FIG. 3, the actuator 160 configured in this way is respectively provided at a set of diagonal corner sections (front right and rear left corner sections) of the lower holding part 120 which is formed in a rectangular shape in plan view.

In this way, the upper stopper mechanism 140, the lower stopper mechanism 150, and the actuator 160 are respectively arranged at a set of diagonal corner sections (front right and rear left corner sections) of the lower holding part 120. The upper stopper mechanism 140, the lower stopper mechanism 150, and the actuator 160, which are arranged at the diagonal corner section, are arranged side by side in the front-rear direction so as to approach each other. Further, the upper stopper mechanism 140 and the lower stopper mechanism 150 are respectively arranged at the other set of diagonal corner sections (front left and rear right corner sections) of the lower holding part 120. The upper stopper mechanism 140 and the lower stopper mechanism 150, which are arranged at the diagonal corner section, are arranged side by side in the front-rear direction so as to approach each other.

<Operation of the Holding Mechanism 100>

The holding mechanism 100 configured in this way can sandwich and hold the film F from above and below with the lower holding part 120 and the upper holding part 130 as described above. The operation of the holding mechanism 100 will be described below with reference to FIG. 2, FIG. 3, FIG. 6, and FIG. 7.

First, the operation when the holding mechanism 100 sandwiches and holds the film F will be described. In FIG. 6 and FIG. 7, the two-dot chain lines indicate how each part moves when the film F is sandwiched.

(a) of FIG. 6 shows a state where the holding mechanism 100 does not hold the film F. In this state, the rod 162 of the actuator 160 is expanded, and the lower holding part 120 and the upper holding part 130 are vertically separated from the film F, respectively.

When the rod 162 of the actuator 160 is contracted from the state shown in (a) of FIG. 6, the upper holding part 130 moves downward together with the rod 162, as shown in (b) of FIG. 6. Thus, the upper holding part 130 approaches the film F from above.

Further, the movable shaft 143 also moves downward together with the upper holding part 130. When the movable shaft 143 moves downward to a predetermined position, the stopper 144 fixed to the movable shaft 143 contacts the lower bushing 141. Thus, the downward movement of the upper holding part 130 is restricted.

When the rod 162 of the actuator 160 is further contracted from the state shown in (b) of FIG. 6, since the movement of the upper holding part 130 is restricted, as shown in FIG. 7, the lower holding part 120 to which the cylinder body 161 is fixed, rather than the upper holding part 130, moves upward. Thus, the lower holding part 120 approaches the film F from below.

By moving the lower holding part 120 upward, the film F is sandwiched between the lower holding part 120 (more specifically, the sponge 122 provided on the lower holding part 120) and the upper holding part 130. At this time, the sponge 122 properly deforms so that the film F can be held more reliably.

Thus, by operating the common actuator 160 (contracting the rod 162), the film F can be held by sequentially moving the upper holding part 130 and the lower holding part 120. In this state, the rectangular portion S (hatched portion in FIG. 3) of the film F along the sponge 122 is sandwiched and held by the lower holding part 120 (sponge 122) and the upper holding part 130. The range (rectangular range) inside the portion where the film F is sandwiched in this way is to be processed by the laser mechanism 50 (hereinafter, this range is referred to as a processing target range P). By sandwiching and holding the portion S extending around the processing target range P with the holding mechanism 100, it is possible to prevent the film F in the processing target range P from shaking or wrinkling due to the influence of vibration or air.

As shown in FIG. 2, since the opening 131 of the upper holding part 130 is formed smaller than the opening 121 of the lower holding part 120, the sponge 122 provided on the lower holding part 120 is arranged so as to be covered from above by the upper holding part 130. Thus, when the film F is processed, it is possible to prevent the sponge 122 from being irradiated with the laser light emitted from above, and prevent damage to the sponge 122.

Next, the operation when the holding mechanism 100 releases the holding of the film F will be described.

When the rod 162 of the actuator 160 is expanded from the state shown in FIG. 7, the cylinder body 161 moves downward. Thus, the lower holding part 120 to which cylinder body 161 is fixed also moves downward away from the film F.

When the lower holding part 120 moves downward to a predetermined position, the stopper 152 fixed to the lower holding part 120 comes into contact with the fixed shaft 151, as shown in (b) of FIG. 6. Thus, the downward movement of the lower holding part 120 is restricted.

When the rod 162 of the actuator 160 is further expanded from the state shown in (b) of FIG. 6, since the movement of the lower holding part 120 is restricted, the upper holding part 130 to which the rod 162 is fixed, rather than the lower holding part 120, moves upward, as shown in (a) of FIG. 6. Thus, the upper holding part 130 is separated from the film F and moves upward.

By operating the common actuator 160 (expanding the rod 162) in this way, the upper holding part 130 and the lower holding part 120 can be sequentially moved to release the holding of the film F. In this state, the film F can be moved toward the winding roller 21 by rotating the feeding roller 23 (see FIG. 1). In particular, by respectively moving the upper holding part 130 and the lower holding part 120 upward and downward (away from the film F), it is possible to prevent the film F from rubbing against the upper holding part 130 and the lower holding part 120 when the film F moves.

<Shape of the Hole F1>

Next, the shape of the hole F1 formed in the film F by the laser mechanism 50 will be described.

As shown in (a) of FIG. 8, in this embodiment, a plurality of holes F1 are formed in the processing target range P of the film F. (a) of FIG. 8 shows an example in which a plurality of holes F1 are formed within a circular range on the assumption that the film F is used for a circular wafer.

When forming the hole F1, the laser mechanism 50 irradiates a laser light along a straight trajectory T, as shown in (b) of FIG. 8. Thus, as shown in (c) of FIG. 8, an elongated hole F1 having a substantially constant width can be formed in the film F. In this embodiment, the hole F1 is formed with a width A of 0.2 to 1.0 mm and a length B of 1.0 to 2.5 mm.

As described above, in this embodiment, the laser light is irradiated straight instead of annularly (for example, circularly) so as to hollow out the hole F1, which can suppress adhesion of the residue of the processed film F to the film F.

Nevertheless, the shape of the hole F1 is not limited to the shape described above, and may be any shape. For example, the aforementioned dimensions of the hole F1 are an example and can be changed arbitrarily. In addition, it is also possible to form the hole F1 by irradiating the laser light along a bent linear (curved) trajectory T such as a circle instead of a straight line. From the viewpoint of suppressing adhesion of the residue of the film F as described above, it is desirable to irradiate the laser light along the linear trajectory T in which the ends are not connected.

Although the embodiments of the present invention have been described above, the present invention is not limited to the above embodiments, and can be modified as appropriate within the scope of the technical idea of the invention described in the claims.

For example, as shown in FIG. 2, this embodiment illustrates an example in which the sponge 122 is provided on the lower holding part 120 so as to reliably sandwich the film F. However, what is provided on the lower holding part 120 is not limited to the sponge 122, and may be an elastic member (for example, rubber or the like).

Further, this embodiment illustrates an example in which the sponge 122 is provided on the lower holding part 120, but it is also possible to provide the sponge 122 on the upper holding part 130 instead of the lower holding part 120 or on both the lower holding part 120 and the upper holding part 130. In addition, it is not always necessary to provide the sponge 122, and it is also possible to configure such that the film F is directly sandwiched between the lower holding part 120 and the upper holding part 130.

Further, as shown in FIGS. 3 and (a) of FIG. 9, this embodiment illustrates an example in which the portion S extending around the processing target range P of the film F is sandwiched and held by the holding mechanism 100, but the portion sandwiching the film F is not limited thereto. For example, as shown in (b) of FIG. 9, it is also possible to sandwich and hold the portions S on the lateral sides of the processing target range P of the film F. In particular, (b) of FIG. 9 shows an example in which both sides of the processing target range P of the film F (both end portions in the width direction (front-rear direction) with respect to the conveying direction of the film F) are sandwiched and held. Nevertheless, the present invention is not limited to the example of (b) of FIG. 9, and it is also possible to configure such that only one side (one lateral side) of the processing target range P of the film F is sandwiched and held.

Besides, as shown in (c) of FIG. 9, it is also possible to sandwich and hold a plurality of portions S of the film F. By sandwiching and holding at least both end portions of the film F in the width direction with respect to the conveying direction (the direction in which tension is applied by the conveyance mechanism), it is possible to prevent the film F in the processing target range P from shaking or wrinkling due to the influence of vibration or air.

Further, in this embodiment, as shown in FIG. 5, the actuator 160 (cylinder body 161) is fixed to the lower holding part 120, but the arrangement of the actuator 160 is not limited thereto. For example, it is also possible to fix the cylinder body 161 to the upper holding part 130 and connect the rod 162 to the lower holding part 120.

Further, this embodiment illustrates an example of using an air cylinder as the actuator 160, but it is possible to use various other systems (for example, an electric cylinder, a hydraulic cylinder, etc.) as the actuator 160.

Moreover, in this embodiment, as shown in FIG. 3, the upper stopper mechanism 140 and the lower stopper mechanism 150 are respectively provided at the corner sections of the lower holding part 120, and the actuator 160 is respectively provided at one set of diagonal corner sections of the lower holding part 120. However, the arrangement of the upper stopper mechanism 140, etc. is not limited thereto, and the upper stopper mechanism 140, etc. can be arranged at any position according to the size, shape, etc. of each part of the holding mechanism 100.

Further, this embodiment illustrates an example in which the film F held by the holding mechanism 100 is processed by the laser mechanism 50, but the processing method is not limited thereto, and various processing methods can be adopted. For example, it is also possible to process the film F held by the holding mechanism 100 by using a cutting tool, by water pressure (water jet) or by using plasma (that is, suitable for an atmospheric pressure/vacuum plasma processing device).

In addition, this embodiment illustrates an example in which the film F is the object (workpiece) to be processed by the laser processing device 1, but it is possible to use not only the film F but also various other processing objects. For example, it is possible to process various processing objects such as metal, rubber, paper, and fabric.

It is also possible to provide the laser processing device 1 with mechanisms other than the mechanisms exemplified in this embodiment. For example, when toxic gas is generated during the processing (for example, when processing a fluorine-based film F), it is also possible to separately provide an exhaust gas processing device.

As described above, the laser processing device 1 according to this embodiment includes: a conveyance mechanism (unwinding mechanism 10 and winding mechanism 20) conveying the film F; a holding mechanism 100 having a pair of holding parts (lower holding part 120 and upper holding part 130) capable of sandwiching and holding at least the lateral sides of the processing target range P of the film F; and a laser mechanism 50 processing the processing target range P of the film F held by the holding mechanism 100. By configuring in this way, the film F can be stably processed. That is, by holding both lateral sides of the film F, it is possible to prevent the film F from shaking or wrinkling due to the influence of vibration or air. The unwinding mechanism 10 and the winding mechanism 20 according to this embodiment are an embodiment of the conveyance mechanism according to the present invention. In addition, the lower holding part 120 and the upper holding part 130 according to this embodiment are an embodiment of a pair of holding parts according to the present invention.

Further, the pair of holding parts are formed in a frame shape capable of sandwiching the portion S of the film F extending around the processing target range P. By configuring in this way, the film F can be processed more stably. That is, by holding the periphery of the processing target range P, it is possible to more effectively prevent the film F from shaking or wrinkling due to the influence of vibration or air.

Further, the pair of holding parts are arranged so as to face each other with the film F sandwiched therebetween. By configuring in this way, the film F can be processed more stably. That is, the film F can be sandwiched more reliably by the pair of holding parts arranged to face each other vertically.

Further, the holding mechanism 100 includes the common actuator 160 that move the pair of holding parts in a direction approaching and a direction separating from the film F. By configuring in this way, the pair of holding parts can be moved by the common actuator 160, and the structure of the laser processing device 1 can be simplified.

Further, the laser mechanism 50 processes to form a plurality of holes F1 in the film F. By configuring in this way, the flowability of air through the film F can be improved. Thus, when the film F is used as a release film, a wafer or the like can be stably sucked through the film F.

Further, the laser mechanism 50 forms the holes F1 in an elongated shape. By configuring in this way, it is possible to suppress adhesion of the residue of the processed film F to the film F. In particular, by irradiating the laser light along the linear trajectory T as in this embodiment, it is possible to effectively prevent the residue from adhering to the film F.

Further, the conveyance mechanism pulls out the film F wound in a roll shape and conveys the film F to the holding mechanism 100, and winds the film F processed by the laser mechanism into a roll shape. By configuring in this way, the roll-shaped film F can be stably processed.

Moreover, a manufacturing method of a processed article (the film F formed with the holes F1) according to this embodiment processes the film F using the laser processing device 1. By configuring in this way, the film F can be stably processed. That is, by sandwiching and holding both lateral sides of the film F, it is possible to prevent the film F from shaking or wrinkling due to the influence of vibration or air.

What is claimed is:

1. A laser processing device, comprising:
a conveyance mechanism conveying a film;
a holding mechanism having a pair of holding parts formed in a frame shape capable of sandwiching and holding a portion of the film extending around a processing target range of the film; and
a laser mechanism processing the processing target range of the film held by the holding mechanism,
wherein the pair of holding parts sandwich an elastic member in addition to the film,
wherein the elastic member is arranged to surround an opening of a first holding part of the pair of holding parts over an entire circumference,
wherein an opening of a second holding part of the pair of holding parts is formed smaller than the opening of the first holding part,
wherein the pair of holding parts are arranged so as to face each other with the film and the elastic member sandwiched therebetween, and wherein the laser mechanism is arranged for irradiating a laser light to the film from a second holding part side.

2. The laser processing device according to claim 1, wherein the holding mechanism comprises a common actuator that moves the pair of holding parts in a direction approaching and a direction separating from the film.

3. The laser processing device according to claim 1, wherein the laser mechanism processes to form a plurality of holes in the film.

4. The laser processing device according to claim 3, wherein the laser mechanism forms the holes in an elongated shape.

5. The laser processing device according to claim 1, wherein the conveyance mechanism pulls out the film wound in a roll shape and conveys the film to the holding mechanism, and winds the film processed by the laser mechanism into a roll shape.

6. A processed article manufacturing method, processing the film using the laser processing device according to claim 1.

7. The laser processing device according to claim 2, wherein the laser mechanism processes to form a plurality of holes in the film.

8. The laser processing device according to claim 2, wherein the conveyance mechanism pulls out the film wound in a roll shape and conveys the film to the holding mechanism, and winds the film processed by the laser mechanism into a roll shape.

9. The laser processing device according to claim 3, wherein the conveyance mechanism pulls out the film wound in a roll shape and conveys the film to the holding mechanism, and winds the film processed by the laser mechanism into a roll shape.

10. The laser processing device according to claim 4, wherein the conveyance mechanism pulls out the film wound in a roll shape and conveys the film to the holding mechanism, and winds the film processed by the laser mechanism into a roll shape.

\* \* \* \* \*